US012607999B2

(12) United States Patent
Chen et al.

(10) Patent No.: US 12,607,999 B2
(45) Date of Patent: Apr. 21, 2026

(54) LOAD DEVICE CONTROL METHOD, ADAPTER APPARATUS, UNMANNED AERIAL VEHICLE, AND CONTROL TERMINAL

(71) Applicant: SZ DJI TECHNOLOGY CO., LTD., Shenzhen (CN)

(72) Inventors: Hanping Chen, Shenzhen (CN); Yong Yang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/674,175

(22) Filed: May 24, 2024

(65) Prior Publication Data

US 2024/0310849 A1 Sep. 19, 2024

Related U.S. Application Data

(63) Continuation of application No. 17/028,504, filed on Sep. 22, 2020, now Pat. No. 11,994,878, which is a
(Continued)

(51) Int. Cl.
*G05D 1/00* (2024.01)
*B64C 39/02* (2023.01)
(Continued)

(52) U.S. Cl.
CPC ......... *G05D 1/0022* (2013.01); *B64C 39/024* (2013.01); *G05D 1/46* (2024.01);
(Continued)

(58) Field of Classification Search
CPC ...... G05D 1/0022; G05D 1/46; B64C 39/024; G06F 21/602; G06F 21/606;
(Continued)

(56) References Cited

U.S. PATENT DOCUMENTS

| | | | | |
|---|---|---|---|---|
| 8,903,568 | B1 * | 12/2014 | Wang | G05D 1/0038 701/2 |
| 10,122,833 | B2 * | 11/2018 | Hammel | G06F 13/20 |
| 2009/0109063 | A1 * | 4/2009 | Grimshaw | H04L 67/08 340/945 |
| 2015/0082975 | A1 * | 3/2015 | Huber | H04L 69/08 89/1.11 |

(Continued)

FOREIGN PATENT DOCUMENTS

| | | |
|---|---|---|
| CN | 102707725 A | 10/2012 |
| CN | 103139459 A | 6/2013 |

(Continued)

OTHER PUBLICATIONS

The World Intellectual Property Organization (WIPO) International Search Report for PCT/CN2018/080175 Nov. 28, 2018 6 pages.

*Primary Examiner* — Michael V Kerrigan
(74) *Attorney, Agent, or Firm* — ANOVA LAW GROUP, PLLC

(57) ABSTRACT

An aerial vehicle includes a body, a flight controller, and an adapter apparatus. The adapter apparatus includes a first communication interface through which the adapter apparatus is communicatively connected to the flight controller, a second communication interface through which the adapter apparatus is communicatively connected to a load device, at least one processor, and at least one memory including computer program code, wherein the at least one memory and the computer program code are configured, with the at least one processor, to cause the adapter apparatus to receive a control command sent by the flight controller for controlling the load device via the first communication interface, convert a first communication protocol between the flight controller and the adapter apparatus into a second communication protocol between the adapter apparatus and the load device, send the control command to the load device using the second communication protocol via the second communication interface.

16 Claims, 10 Drawing Sheets

Related U.S. Application Data continuation of application No. PCT/CN2018/080175, filed on Mar. 23, 2018.

(51) Int. Cl.

| | |
|---|---|
| *G05D 1/46* | (2024.01) |
| *G06F 21/60* | (2013.01) |
| *H04L 67/125* | (2022.01) |
| *H04L 67/53* | (2022.01) |
| *H04L 69/08* | (2022.01) |
| *H04W 12/037* | (2021.01) |
| *B64D 47/08* | (2006.01) |
| *B64U 101/30* | (2023.01) |

(52) U.S. Cl.
CPC .......... *G06F 21/602* (2013.01); *H04L 67/125* (2013.01); *H04L 67/53* (2022.05); *H04L 69/08* (2013.01); *H04W 12/037* (2021.01); *B64D 47/08* (2013.01); *B64U 2101/30* (2023.01)

(58) Field of Classification Search
CPC ....... H04L 67/125; H04L 67/53; H04L 69/08; H04W 12/037; H04W 4/44; H04W 12/03; B64D 47/08; B64U 2101/30
See application file for complete search history.

(56) References Cited

U.S. PATENT DOCUMENTS

| | | |
|---|---|---|
| 2015/0370250 A1 | 12/2015 | Bachrach et al. |
| 2016/0301849 A1 | 10/2016 | Wenxuan |
| 2016/0323420 A1 | 11/2016 | Kutka |
| 2017/0011339 A1 | 1/2017 | Buford |
| 2017/0154536 A1 | 6/2017 | Kreiner et al. |
| 2017/0329324 A1 | 11/2017 | Bachrach et al. |
| 2018/0288303 A1 | 10/2018 | Wang et al. |

FOREIGN PATENT DOCUMENTS

| | | |
|---|---|---|
| CN | 104468593 A | 3/2015 |
| CN | 105278362 A | 1/2016 |
| CN | 105807779 A | 7/2016 |
| CN | 105818983 A | 8/2016 |
| CN | 205880668 U | 1/2017 |
| CN | 205983105 U | 2/2017 |
| CN | 106789463 A | 5/2017 |
| CN | 106814751 A | 6/2017 |
| CN | 107197136 A | 9/2017 |
| CN | 107634816 A | 1/2018 |
| JP | 3213398 U | 11/2017 |
| JP | 3214757 U | 2/2018 |
| WO | 2017177541 A1 | 10/2017 |
| WO | 2018010473 A1 | 1/2018 |

* cited by examiner

LOAD DEVICE CONTROL METHOD, ADAPTER APPARATUS, UNMANNED AERIAL VEHICLE, AND CONTROL TERMINAL

CROSS-REFERENCE TO RELATED APPLICATION

This application is a continuation of application Ser. No. 17/028,504, filed on Sep. 22, 2020, which is a continuation of International Application No. PCT/CN2018/080175, filed on Mar. 23, 2018, the entire contents of both of which are incorporated herein by reference.

TECHNICAL FIELD

The present disclosure relates to the technical field of unmanned aerial vehicle (UAV) and, more particularly, to a load device control method, an adapter apparatus, a UAV, and a control terminal.

BACKGROUND

In conventional technologies, a gimbal of an unmanned aerial vehicle (UAV) carries a shooting device. When the UAV is in a flight state, the shooting device performs an aerial photography.

However, the shooting device carried by the UAV does not satisfy needs of some third-party manufacturers. Some third-party manufacturers need the UAV to carry the third-party devices developed by themselves. Currently, most UAVs do not support the third-party devices, thereby causing applications of the UAVs to be limited.

SUMMARY

In accordance with the disclosure, there is provided a load device control method including an adapter apparatus receiving a control command sent by an unmanned aerial vehicle (UAV) for controlling a load device connected to the UAV via the adapter apparatus, converting a first communication protocol between the UAV and the adapter apparatus into a second communication protocol between the adapter apparatus and the load device, and sending the control command to the load device using the second communication protocol.

Also in accordance with the disclosure, there is provided a load device control method including an unmanned aerial vehicle (UAV) receiving a control command sent by a control terminal for controlling a load device connected to the UAV via an adapter apparatus, and sending the control command to the load device via the adapter apparatus.

Also in accordance with the disclosure, there is provided an adapter apparatus including a first communication interface through which the adapter apparatus is communicatively connected to an unmanned aerial vehicle (UAV), a second communication interface through which the adapter apparatus is communicatively connected to a load device, and a processor. The processor is configured to receive a control command sent by the UAV for controlling the load device via the first communication interface, convert a first communication protocol between the UAV and the adapter apparatus into a second communication protocol between the adapter apparatus and the load device, and send the control command to the load device using the second communication protocol via the second communication interface.

BRIEF DESCRIPTION OF THE DRAWINGS

In order to provide a clearer illustration of technical solutions of disclosed embodiments, the drawings used in the description of the disclosed embodiments are briefly described below. It will be appreciated that the disclosed drawings are merely examples and other drawings conceived by those having ordinary skills in the art on the basis of the described drawings without inventive efforts should fall within the scope of the present disclosure.

Figure 1:
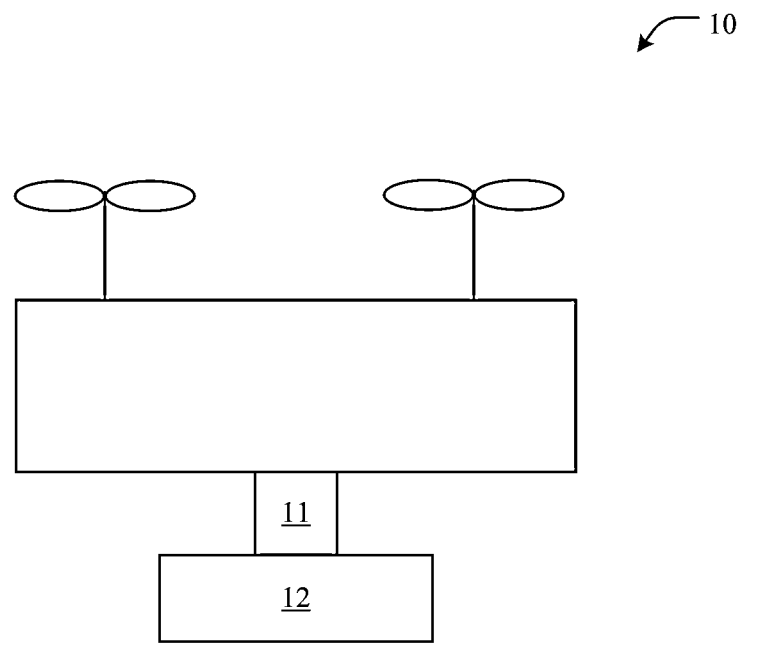
FIG. 1 is a schematic diagram of an unmanned aerial vehicle (UAV) consistent with embodiments of the disclosure.

| Reference Numerals | |
|---|---|
| 10 | UAV |
| 11 | Gimbal |
| 12 | Shooting device |
| 30 | UAV |
| 31 | Body |
| 32 | Adapter apparatus |
| 33 | Gimbal |
| 34 | Third-party device |
| 61 | Adapter apparatus |
| 62 | Gimbal |
| 110 | Adapter apparatus |
| 111 | First communication interface |
| 112 | Second communication interface |
| 113 | Processor |
| 114 | Encryption chip |
| 115 | Power interface |
| 116 | Universal Serial Bus (USB) to network card (NIC) chip |
| 120 | UAV |
| 121 | Flight controller |
| 122 | Motor |
| 123 | Propeller |

-continued

| Reference Numerals | |
| --- | --- |
| 124 | Electronic speed controller |
| 125 | Adapter apparatus |
| 126 | Communication system |
| 1261 | First communication interface |
| 1262 | Second communication interface |
| 127 | Gimbal |
| 128 | Third-party device |
| 130 | Control terminal |
| 131 | Processor |
| 132 | Communication interface |

DETAILED DESCRIPTION OF THE EMBODIMENTS

In order to provide a clearer illustration of technical solutions of disclosed embodiments, example embodiments will be described with reference to the accompanying drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via another component between them.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

Hereinafter, the example embodiments will be described with reference to the accompanying drawings. Unless conflicting, the exemplary embodiments and features in the exemplary embodiments can be combined with each other.

FIG. 1 is a schematic diagram of an example unmanned aerial vehicle (UAV) 10 consistent with the disclosure. As shown in FIG. 1, the UAV 10 carries a shooting device 12 via a gimbal 11. Image data or video data shot by the shooting device 12 can be transmitted to a control terminal on the ground, such as a remote controller or a user terminal, through a communication system of the UAV 10. As application fields of the UAV become wider and wider, some third-party manufacturers hope the UAV can carry third-party devices. Currently, most UAVs do not support the third-party devices, thereby causing the applications of the UAV to be limited. In order to solve the problem, the present disclosure provides a load device control method. The example load device control method consistent with the disclosure will be described below.

Figure 2:
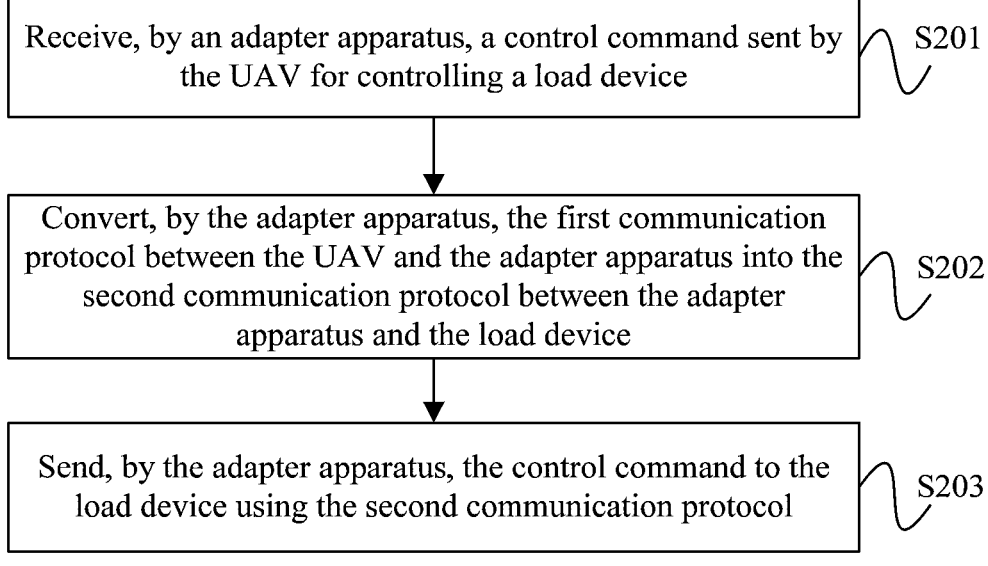
FIG. 2 is a schematic flow chart of a load device control method consistent with embodiments of the disclosure.

FIG. 2 is a schematic flow chart of an example load device control method consistent with the disclosure. As shown in FIG. 2, at S201, an adapter apparatus receives a control command sent by the UAV for controlling a load device.

In order to enable the UAV to support the third-party device, the adapter apparatus is provided, and the adapter apparatus may include an adapter board, an adapter ring, or the like, of a Payload Software Development Kit (SDK). The load device can be connected to the adapter apparatus, and the adapter apparatus can be connected to a body of the UAV.

Figure 3:
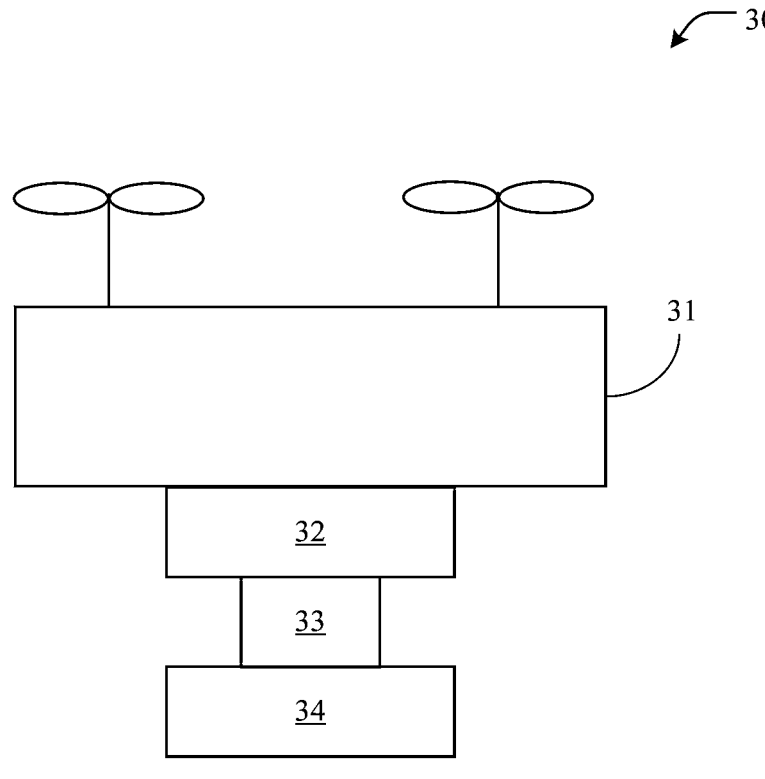
FIG. 3 is a schematic diagram of another UAV consistent with embodiments of the disclosure.

FIG. 3 is a schematic diagram of another example UAV 30 consistent with the disclosure. As shown in FIG. 3, a body 31 of the UAV 30 is connected to an adapter apparatus 32, and the adapter apparatus 32 is connected to the load device. In the example shown in FIG. 3, the load device includes both a gimbal 33 and a third-party device 34. In some other embodiments, the load device may only include the third-party device 34. In some embodiments, the body 31 of the UAV 30 and the adapter apparatus 32 can be connected via a quick release connector. For example, an end of the quick release connector can be connected to the body 31 of the UAV 30, another end of the quick release connector can be connected to the adapter apparatus 32, and the load device can be connected to the adapter apparatus 32. The adapter apparatus 32 and the load device can be detached from the UAV 30 as a whole, or the adapter apparatus 32 and the load device can be mounted at the UAV 30 as a whole.

Figure 4:
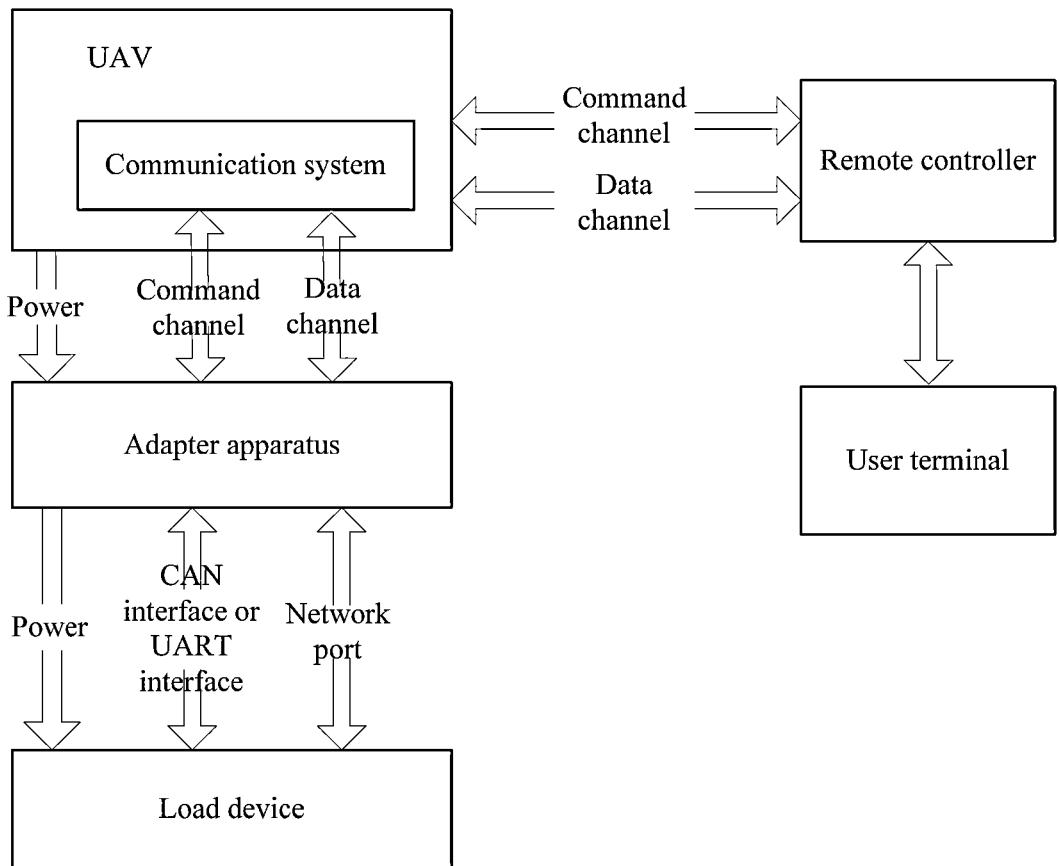
FIG. 4 is a schematic structural diagram of a system consistent with embodiments of the disclosure.

When the load device is mounted at the UAV via the adapter apparatus, the load device can also be controlled by a control terminal on the ground, and the control terminal may include a device such as a remote controller, a user terminal, or the like. FIG. 4 is a schematic structural diagram of an example system consistent with the disclosure. As shown in FIG. 4, the remote controller can send the control command through a command channel between the remote controller and the communication system of the UAV. The control command may refer to the control command for controlling the load device. For example, the control command can be used to control the gimbal 33 and/or the third-party device 34 in FIG. 3. In some embodiments, the control command may be generated by the user terminal.

As shown in FIG. 4, in response to receiving the control command, the communication system of the UAV can send the control command to the adapter apparatus. In some embodiments, a communication protocol between the communication system of the UAV and the adapter apparatus can include an internal protocol, and a communication protocol between the adapter apparatus and the load device can include an external protocol. In some embodiments, the internal protocol between the communication system of the UAV and the adapter apparatus can be referred to as a first communication protocol, and the external protocol between the adapter apparatus and the load device can be referred to as a second communication protocol. After receiving the control command, the communication system of the UAV can use the first communication protocol to send the control command to the adapter apparatus through the command channel between the communication system and the adapter apparatus.

Referring again to FIG. 2, at S202, the adapter apparatus converts the first communication protocol between the UAV and the adapter apparatus into the second communication protocol between the adapter apparatus and the load device. In response to receiving the control command sent by the UAV using the first communication protocol, the adapter apparatus can convert the internal protocol between the communication system of the UAV and the adapter apparatus to the external protocol between the adapter apparatus and the load device. One example way for the adapter apparatus to convert the internal protocol to the external protocol is that the adapter apparatus can add a header that conforms to the external protocol at an outer layer of an internal protocol message, such that the internal protocol message can be converted into an external protocol message.

At S203, the adapter apparatus sends the control command to the load device using the second communication protocol. As shown in FIG. 4, a communication interface between the adapter apparatus and the load device can include a controller area network (CAN) interface or a universal asynchronous receiver/transmitter (UART) interface. After converting the internal protocol between the communication system of the UAV and the adapter apparatus to the external protocol between the adapter apparatus and the load device, and the adapter apparatus can use the external protocol to send the control command to the load device via the CAN interface or UART interface.

Figure 5:
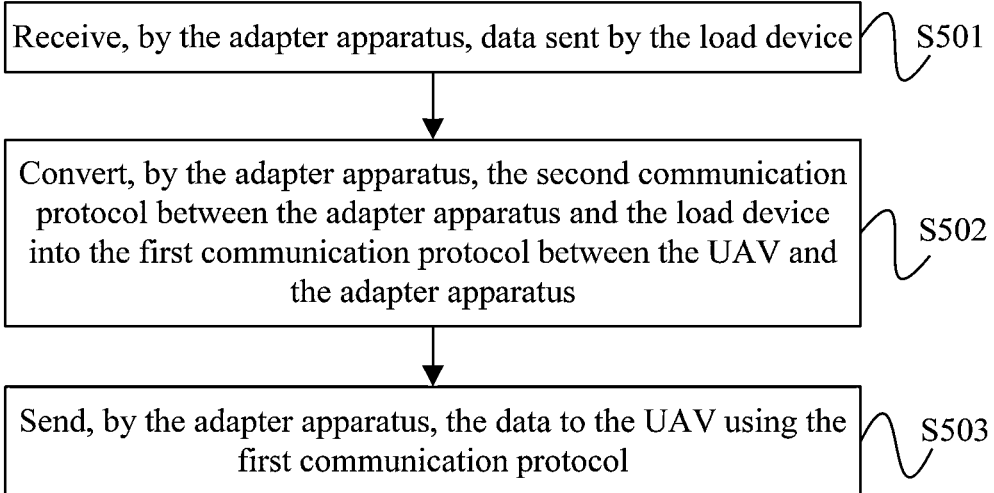
FIG. 5 is a schematic flow chart of another load device control method consistent with embodiments of the disclosure.

FIG. 5 is a schematic flow chart of another load device control method consistent with the disclosure. The method shown in FIG. 5 can be combined with the method shown in FIG. 2.

As shown in FIG. 5, at S501, the adapter apparatus receives data sent by the load device. For example, the third-party device 34 shown in FIG. 3 can include a gas sensor. When the gas sensor senses gas component in the air, sensing data needs to be sent to the control terminal on the ground. The load device in FIG. 4 includes the gimbal 33 and the third-party device 34 shown in FIG. 3. Referring again to FIG. 4, the load device may send the sensing data of the third-party device 34 to the adapter apparatus through a network port between the load device and the adapter apparatus, and the adapter apparatus can receive the sensing data of the third-party device 34 sent by the load device through the network port. The load device may also send the sensing data of the third-party device 34 through the CAN interface or the UART interface between the load device and the adapter apparatus, and the adapter apparatus can receive the sensing data of the third-party device sent by the load device through the CAN interface or the UART interface. In some embodiments, when sending the sensing data of the third-party device 34 to the adapter apparatus through the network port, the CAN interface, or the UART interface, the load device can use the second communication protocol, e.g., the external protocol.

At S502, the adapter apparatus converts the second communication protocol between the adapter apparatus and the load device into the first communication protocol between the UAV and the adapter apparatus. As shown in FIG. 4, after receiving the sensing data of the third-party device 34 sent by the load device, the adapter apparatus can convert the external protocol between the adapter apparatus and the load device into the internal protocol between the UAV communication system and the adapter apparatus.

Referring again to FIG. 5, at S503, the adapter apparatus sends the data to the UAV using the first communication protocol. The adapter apparatus can use the internal protocol to send the sensing data of the third-party device 34 to the communication system of the UAV through a data channel between the adapter apparatus and the UAV. The communication system can further send the sensing data of the third-party device 34 to the remote controller through a data channel between the UAV and the remote controller, and the remote controller can forward the sensing data of the third-party device 34 to the user terminal. In some embodiments, the control terminal on the ground may merely include the user terminal, i.e., the user terminal can communicate with the UAV without using a forwarding of the remote controller.

In some other embodiments, before sending, by the adapter apparatus, the data to the UAV using the first communication protocol at S203, the method may further include encrypting, by the adapter apparatus, the data to obtain encrypted data. Sending, by the adapter apparatus, the data to the UAV using the first communication protocol can include sending, by the adapter apparatus, the encrypted data to the UAV using the first communication protocol.

After receiving the sensing data of the third-party device 34 sent by the load device, the adapter apparatus may further encrypt the sensing data to obtain the encrypted data, thereby improving a security of the sensing data. In some embodiments, the adapter apparatus can use the internal protocol to send the encrypted data to the communication system of the UAV through the data channel between the adapter apparatus and the UAV. The communication system can send the encrypted data to the remote controller through the data channel between the UAV and the remote controller, and the remote controller can forward the encrypted data to the user terminal.

Consistent with the disclosure, the load device can be connected to the adapter apparatus, and the adapter apparatus can be connected to the body of the UAV, such that the load device can be carried by the UAV via the adapter apparatus. In response to receiving the control command sent by the UAV for controlling the load device, the adapter apparatus can convert the internal protocol between the UAV and the adapter apparatus to the external protocol between the adapter apparatus and the load device, and send the control command to the load device using the external protocol. Therefore, the third-party device produced by a third-party manufacturer can communicate with the UAV using the external protocol, such that the UAV can support the third-party device, thereby increasing an application range of the UAV.

The present disclosure further provides another load device control method. On the basis of the example methods described above, the method may further include sending, be the adapter apparatus, a handshake command to the load device. The handshake command can be used to detect whether the adapter apparatus and the load device are in a normal communication connection.

In some embodiments, the adapter apparatus may periodically or non-periodically send the handshake command to the load device. If the load device does not answer, or a response message of the load device is wrong, the adapter apparatus can disconnect the communication connection with the load device, or the adapter apparatus can retain an upgrade function and turn off other functions.

In some embodiments, the adapter apparatus can include a power interface, and the power interface can be used to supply power to the load device. Referring again to FIG. 4, the UAV can supply power to the adapter apparatus, and the adapter apparatus can further power the load device. In some embodiments, the adapter apparatus can include a power supply interface, and the adapter apparatus can supply power to the load device through the power supply interface.

In some embodiments, the communication interface between the UAV and the adapter apparatus can include a universal serial bus (USB) interface. The method further includes converting, by the adapter apparatus, the USB interface into the network port. In some embodiments, the load device can include the gimbal and the third-party device, and the third-party device can communicatively connected to the adapter apparatus through the network port.

As shown in FIG. 4, the data channel between the communication system of the UAV and the adapter apparatus can be realized through USB, e.g., the communication interface between the UAV and the adapter apparatus for realizing the data channel can be the USB interface. The adapter apparatus can further convert the USB interface into the network port, and the network port can include an Ethernet port. The load device can perform a data transmission with the adapter apparatus through the network port. As such, the load device can conveniently use a transmission control protocol to perform a network communication with the adapter apparatus without downloading a USB analog network card driver.

In some embodiments, the interface of the UAV for outputting via the quick release connector can include the CAN port, the USB port, and a 12V/4 A power port. The CAN port, the USB port, and the 12V/4 A power port connected to the adapter apparatus. The CAN port, the USB port, and the 12V/4 A power port can be converted by the adapter apparatus using a protocol conversion to generate a set of external interfaces.

Figure 6:
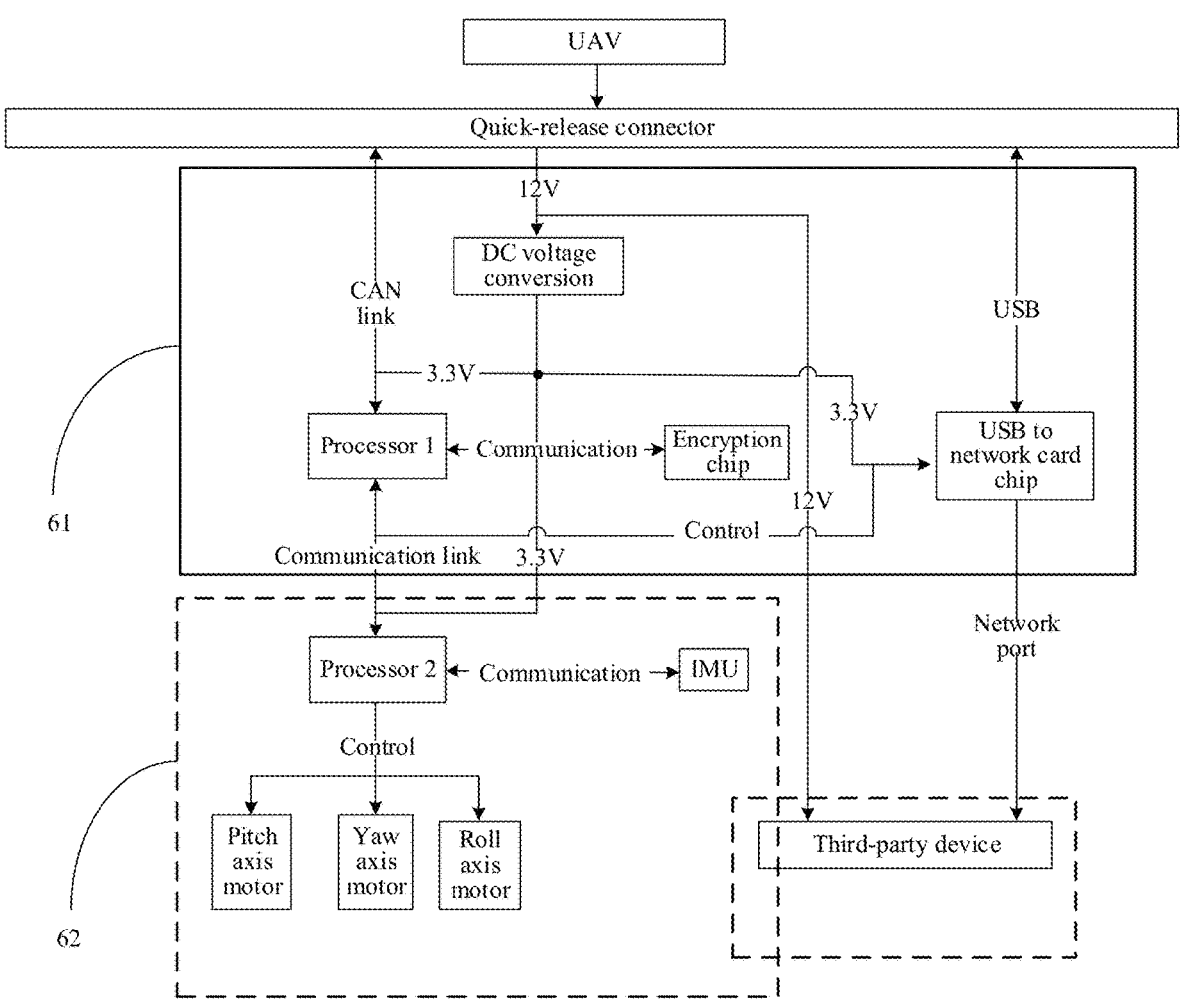
FIG. 6 is a schematic diagram showing an adapter apparatus consistent with embodiments of the disclosure.

FIG. 6 is a schematic diagram showing an example adapter apparatus 61 consistent with the disclosure. As shown in FIG. 6, the adapter apparatus 61 is connected to the UAV through the quick-release connector, and the load device is connected to the adapter apparatus 61. The load device includes a gimbal 62 and the third-party device. The adapter apparatus 61 includes processor 1, an encryption chip, and a USB to network card chip. Processor 1 may include a micro controller unit (MCU). The command channel between the UAV and the adapter apparatus 61 may include a CAN link as shown in FIG. 6, and the data channel between the UAV and the adapter apparatus 61 may include a USB link shown in FIG. 6. A communication link between the adapter apparatus 61 and the gimbal 62 may include the CAN link or a UART link. Processor 1 can convert an internal protocol of the CAN link between UAV and processor 1 to an external protocol of a communication link between processor 1 and processor 2. The gimbal 62 includes processor 2, and processor 2 can communicate with an inertial measurement unit (IMU) of the gimbal 62. Processor 1 can communicate with the encryption chip. Processor 1 can encrypt the control command for controlling the load device, and can further encrypt the data returned by the third-party device. The USB to network card chip can convert the USB interface between the UAV and the adapter apparatus 61 into the network port, such that the third-party device can communicate with the adapter apparatus 61 through the network port. For example, the third-party device can send the data detected by the third-party device to the adapter apparatus 61 through the network port, and then the adapter apparatus 61 can forward the data to the UAV, and then the UAV can forward the data to the control terminal on the ground. As shown in FIG. 6, the adapter apparatus 61 can provide 12V voltage provided by the UAV to the third-party device for use. In addition, the adapter apparatus 61 can further have a function of direct current (DC) voltage conversion. For example, the adapter apparatus 61 can convert 12V voltage provided by the UAV into 3.3V voltage, and 3.3V voltage can supply power to processor 1, the USB to network card chip, and processor 2. In addition, the UAV can further send the control command for controlling the gimbal 62 to the load device through the adapter apparatus 61. The control command can control at least one of a pitch axis motor, a yaw axis motor, and a roll axis motor of the gimbal 62.

In some other embodiments, the method can further include receiving, by the adapter apparatus, a control sent by the load device. The control can be used to control the load device. The method can further include sending, by the adapter apparatus, the control to the UAV. As such, the UAV can send the control to the control terminal.

The third-party manufacturer can develop a control for controlling the third-party device based on the Payload SDK. The control may include an applet. The applet can be loaded in an application (APP) used to control the UAV in the control terminal, such that the third-party manufacturer does not need to develop an APP for controlling the third-party device. The third-party manufacturer can upload the control to a server. When the user needs to control the third-party device, the control can be downloaded from the server via the control terminal and be loaded into the APP for controlling the UAV in the control terminal, thereby allowing the user to control the UAV and the third-party device at the same time through one APP. In some embodiments, the third-party manufacturer can store the control in the third-party device. When the third-party device is in a working state, the third-party device can send the control to the adapter apparatus. The adapter apparatus can receive the control sent by the third-party device and send the control to the UAV, and the UAV can forward the control to the control terminal. When the control terminal receives the control, the control can be loaded into the APP for controlling the UAV, such that the user can control the UAV and the third-party device at the same time through one APP.

Consistent with the disclosure, through sending, by the adapter apparatus, the handshake command to the load device, the communication connection between the load device and the adapter apparatus can be detected to ensure the normal communication connection between the load device and the adapter apparatus. The USB interface can be converted into the network port by the adapter apparatus, such that the load device can conveniently use the transmission control protocol to communicate with the adapter apparatus for network communication without downloading the USB analog network card driver. The adapter apparatus can receive the control sent by the third-party device and sent the control to the UAV, such that the UAV can forward the control to the control terminal. When the control terminal receives the control, the control can be loaded into the APP for controlling the UAV, such that the user can control the UAV and the third-party device at the same time through one APP, thereby improving a development efficiency of the third-party manufacturer and enhancing a user experience.

Figure 7:
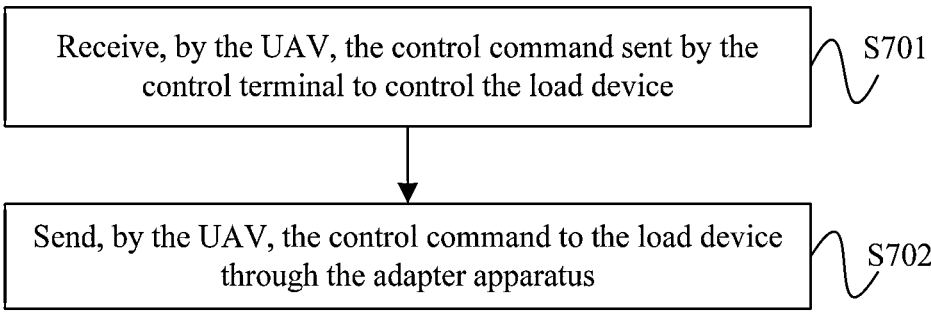
FIG. 7 is a schematic flow chart of another load device control method consistent with embodiments of the disclosure.

The present disclosure further provides another load device control method. FIG. 7 is a schematic flow chart of another example load device control method consistent with the disclosure. As shown in FIG. 7, at S701, the UAV receives the control command sent by the control terminal to control the load device. In some embodiments, the control terminal can include the remote controller and the user terminal.

Referring again to FIG. 4, the communication system of the UAV can receive the control command through the command channel between the remote controller and the UAV. The control command may refer to the control command for controlling the load device. For example, the control command can be used to control the gimbal 33 and/or the third-party device 34 in FIG. 3. In some embodiments, the control command may be generated by the user terminal.

In some embodiments, the load device can be connected to the adapter apparatus, and the adapter apparatus can be connected to the body of the UAV. Referring again to FIG. 3, the body 31 of the UAV 30 is connected to the adapter apparatus 32, and the adapter apparatus 32 is connected to the load device. The load device includes the gimbal 33 and the third-party device 34.

Referring again to FIG. 7, at S702, the UAV sends the control command to the load device through the adapter apparatus. As shown in FIG. 4, in response to receiving the control command, the communication system of the UAV can send the control command to the adapter apparatus. In some embodiments, the communication protocol between the communication system of the UAV and the adapter apparatus can include the internal protocol, and the communication protocol between the adapter apparatus and the load device can include the external protocol. In some embodiments, the internal protocol between the communication system of the UAV and the adapter apparatus can be referred to as the first communication protocol, and the external protocol between the adapter apparatus and the load device can be referred to as the second communication protocol. After receiving the control command, the communication system of the UAV can use the first communication protocol to send the control command to the adapter apparatus through the command channel between the communication system and the adapter apparatus. After receiving the control command, the communication system of the UAV can use the first communication protocol to send the control command to the adapter apparatus through the command channel between the communication system and the adapter apparatus. In response to receiving the control command sent by the UAV using the first communication protocol, the adapter apparatus can convert the internal protocol between the communication system of the UAV and the adapter apparatus to the external protocol between the adapter apparatus and the load device, and then use the external protocol to send the control command to the load device via the CAN interface or UART interface.

Figure 8:
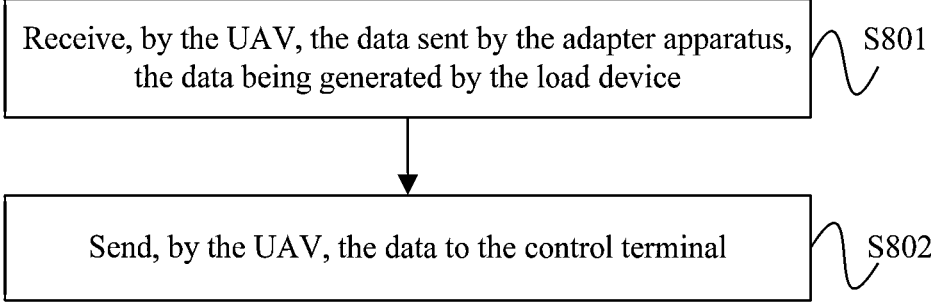
FIG. 8 is a schematic flow chart of another load device control method consistent with embodiments of the disclosure.

FIG. 8 is a schematic flow chart of another example load device control method consistent with the disclosure. The method shown in FIG. 8 can be combined with the method shown in FIG. 7. As shown in FIG. 8, at S801, the UAV receives the data sent by the adapter apparatus, and the data is generated by the load device.

Referring again to FIG. 4, the load device may send the data to the adapter apparatus through the network port between the load device and the adapter apparatus, and the data may be generated by the third-party device. In response to receiving the data sent by the load device, the adapter apparatus can convert the external protocol between the adapter apparatus and the load device to the internal protocol between the communication system of the UAV and the adapter apparatus, and use the internal protocol to send the data to the UAV, and the UVA can receive the data sent by the adapter apparatus.

Referring again to FIG. 8, at S802, the UAV sends the data to the control terminal. The UAV can send the data to the remote controller through the data channel between the UAV and the remote controller via the communication system of the UAV, and the remote controller can forward the data to the user terminal. In some embodiments, the data can include the encrypted data. For example, in response to receiving the data sent by the load device, the adapter apparatus can encrypt the data to obtain the encrypted data. The adapter apparatus can use the internal protocol to send the encrypted data to the UAV through the data channel between the adapter apparatus and the UAV, and the encrypted data can be sent by the communication system of the UAV to the remote controller through the data channel between the UAV and the remote controller, and the remote controller can then forward the encrypted data to the user terminal.

Consistent with the disclosure, the load device can be connected to the adapter apparatus, and the adapter apparatus can be connected to the body of the UAV, such that the load device can be carried on the UAV through the adapter apparatus. In response to receiving the control command sent by the UAV for controlling the load device, the adapter apparatus can convert the internal protocol between the UAV and the adapter apparatus to the external protocol between the adapter apparatus and the load device, and use the external protocol to send the control command to the load device. The third-party device produced by the third-party manufacturer can communicate with the UAV through the external protocol, such that the UAV can support the third-party device, thereby increasing the application range of the UAV.

Figure 9:
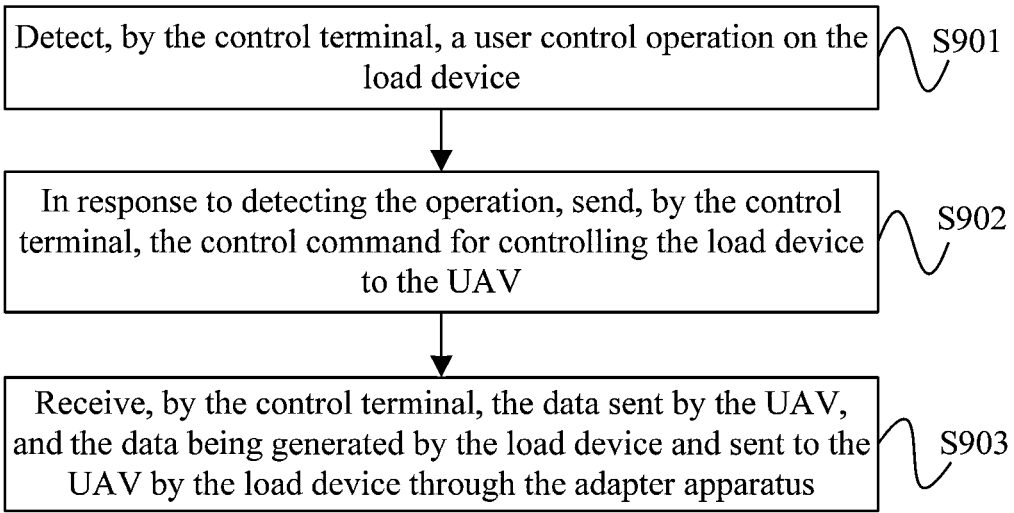
FIG. 9 is a schematic flow chart of another load device control method consistent with embodiments of the disclosure.

The present disclosure further provides another load device control method. FIG. 9 is a schematic flow chart of another example load device control method consistent with the disclosure. As shown in FIG. 9, at S901, the control terminal detects a user control operation on the load device. In order to enable the UAV to support the third-party device, the adapter apparatus is provided, and the adapter apparatus may include the adapter board, the adapter ring, or the like, of the Payload SDK. The load device can be connected to the adapter apparatus, and the adapter apparatus can be connected to the body of the UAV. Referring again to FIG. 3, the body 31 of the UAV 30 is connected to the adapter apparatus 32, and the adapter apparatus 32 is connected to the load device. The load device may include both the gimbal 33 and the third-party device 34, or the load device may only include the third-party device 34.

In some embodiments, the control terminal can include the remote controller and the user terminal. Referring again to FIG. 4, an APP is installed in the user terminal, and the APP can be used to control the load device, and the user terminal can detect the user control operation on the load device.

Referring again to FIG. 9, at S902, in response to detecting the operation, the control terminal sends the control command for controlling the load device to the UAV. In response to detecting the user control operation on the load device, the user terminal can generate the control command and send the control command to the remote controller, and the remote controller can send the control command to the UAV through the command channel.

In some embodiments, at S903, the control terminal receives the data sent by the UAV. The data can be generated by the load device and sent to the UAV by the load device through the adapter apparatus. In response to generating the data, the load device can send the data to the adapter apparatus through the network port, the adapter apparatus can further send the data to the UAV through the data channel between the adapter apparatus and the UAV, and the UAV can send the data to the remote controller through the data channel between the UAV and the remote controller. The user terminal can receive the data generated by the load device from the remote controller.

Figure 10:
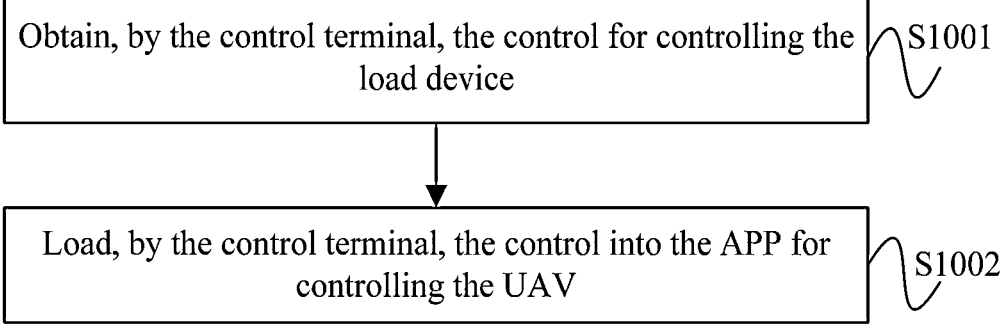
FIG. 10 is a schematic flow chart of another load device control method consistent with embodiments of the disclosure.

FIG. 10 is a schematic flow chart of another example load device control method consistent with the disclosure. The method shown in FIG. 10 can be combined with the method shown in FIG. 9, and can be performed, before detecting, by the control terminal, the user control operation on the load device at S901.

As shown in FIG. 10, at S1001, the control terminal obtains the control for controlling the load device. In some embodiments, there are several implementation manners for obtaining, by the control terminal, the control for controlling the load device.

For example, the control terminal can download the control for controlling the load device from the server. The third-party manufacturer can develop the control for controlling third-party device based on the Payload SDK. The control can be the applet. When the third-party manufacturer develops the control, the control can be uploaded to the server. When the user needs to control the third-party device, the control terminal can download the control from the server.

As another example, the control terminal can receive the control sent by the UAV for controlling the load device. The third-party manufacturer can store the control in the third-party device. When the third-party device is in the working state, the third-party device can send the control to the adapter apparatus, and the adapter apparatus can receive the control sent by the third-party device and send the control to the UAV. The UAV can forward the control to the control terminal.

At S1002, the control terminal loads the control into the APP for controlling the UAV. After downloading the control from the server or in response to receiving the control from the UAV, the control terminal can load the control into the APP for controlling the UAV in the control terminal, such that the user can control the UAV and third-party device at the same time.

Detecting, by the control terminal, the user control operation on the load device can include detecting, by the control terminal, an operation on the control by the user. For example, the control terminal can load the control into the APP for controlling the UAV in the control terminal, and the APP can display a pop-up window, an icon, or a window to show the control. The user can control the third-party device through the pop-up window, the icon, or the window. In some embodiments, the pop-up window, the icon, or the window can further display the data captured by the third-party device.

Consistent with the disclosure, the third-party manufacturer can develop the control for controlling the third-party device based on the Payload SDK. The control terminal can download the control from the server, or the third-party device can send the control to the control terminal through the adapter apparatus and the UAV. The control terminal can load the control into the APP for controlling the UAV, such that the user can control the UAV and the third-party device at the same time through one APP, thereby improving the development efficiency of the third-party manufacturer and enhancing the user experience.

Figure 11:
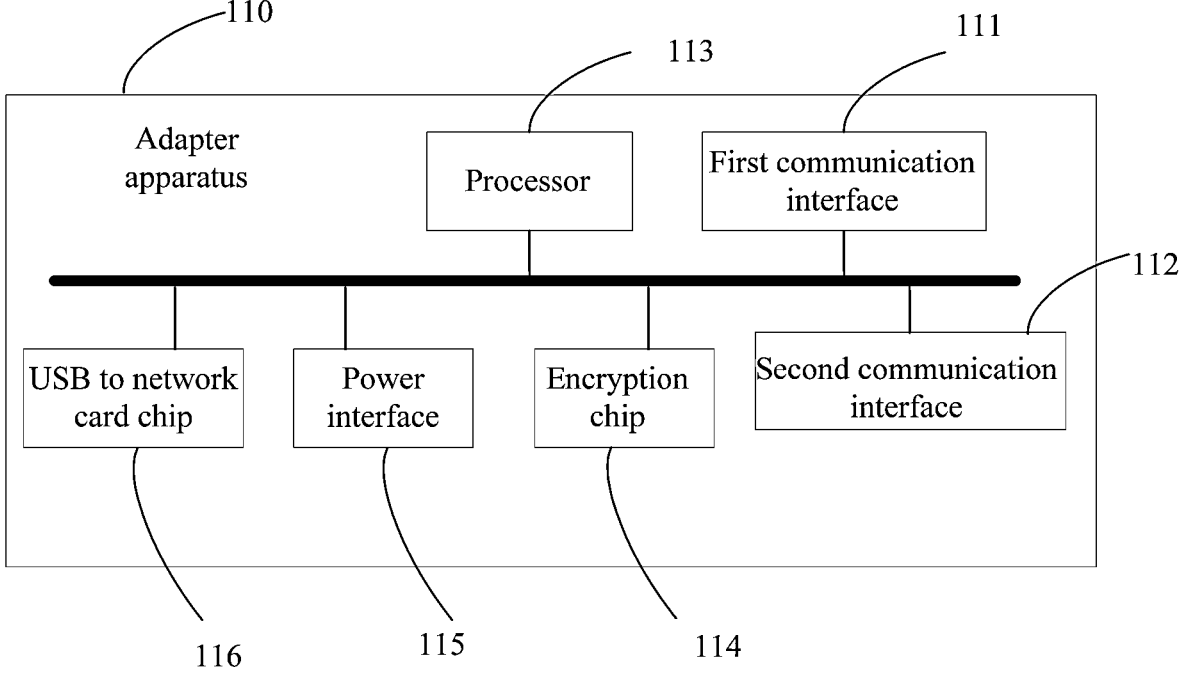
FIG. 11 is a schematic structural diagram of another adapter apparatus consistent with embodiments of the disclosure.

The present disclosure further provides an adapter apparatus. FIG. 11 is a schematic structural diagram of an example adapter apparatus 110 consistent with the disclosure. As shown in FIG. 11, the adapter apparatus 110 includes a first communication interface 111, a second communication interface 112, and a processor 113. The adapter apparatus 110 is communicatively connected to the UAV through the first communication interface 111, and the adapter apparatus 110 is communicatively connected to the load device through the second communication interface 112. The processor 113 can be configured to receive the control command sent by the UAV for controlling the load device via the first communication interface 111, convert the first communication protocol between the UAV and the adapter apparatus 110 into the second communication protocol between the adapter apparatus 110 and the load device, and send the control command to the load device using the second communication protocol via the second communication interface 112.

In some embodiments, the processor 113 can be further configured to receive the data sent by the load device via the second communication interface 112, convert the second communication protocol between the adapter apparatus 110 and the load device into the first communication protocol between the UAV and the adapter apparatus 110, and send the data to the UAV using the first communication protocol via the first communication interface 111.

In some embodiments, the adapter apparatus 110 further includes an encryption chip 114 communicatively connected to the processor 113. Before sending the data to the UAV using the first communication protocol via the first communication interface 111, the processor 113 may be further configured to encrypt the data by using the encryption chip 114 to obtain the encrypted data. Sending, by the processor 113, the data to the UAV using the first communication protocol via the first communication interface 111 can include sending the encrypted data to the UAV using the first communication protocol via the first communication interface 111.

In some embodiments, the processor 113 can be further configured to send the handshake command to the load device via the second communication interface 112. The handshake command can be used to detect whether the adapter apparatus 110 and the load device are in the normal communication connection.

In some embodiments, the adapter apparatus 110 further includes a power interface 115, and the power interface 115 can be used to supply power to the load device. In some embodiments, the first communication interface 111 includes the USB interface. The adapter apparatus 110 further includes a USB to network card chip 116 configured to convert the USB interface to the network port. The second communication interface 112 can include the network port.

In some embodiments, the load device can include the gimbal and the third-party device. The third-party device can be communicatively connected to the adapter apparatus 110 through the network port.

In some embodiments, the processor 113 can be further configured to receive the control sent by the load device via the second communication interface 112 and send the control to the UAV via the first communication interface 111. The control can be used to control the load device. As such, the UAV can send the control to the control terminal.

The principles and implementations of the adapter apparatus 110 are similar to those of the adapter apparatus 61 in FIG. 6, and detailed description thereof is omitted here.

Consistent with the disclosure, the load device can be connected to the adapter apparatus, and the adapter apparatus can be connected to the body of the UAV, such that the load device can be carried on the UAV through the adapter apparatus. In response to receiving the control command sent by the UAV for controlling the load device, the adapter apparatus can convert the internal protocol between the UAV and the adapter apparatus to the external protocol between the adapter apparatus and the load device, and use the external protocol to send the control command to the load device. The third-party device produced by the third-party manufacturer can communicate with the UAV through the external protocol, such that the UAV can support the third-party device, thereby increasing the application range of the UAV.

Figure 12:
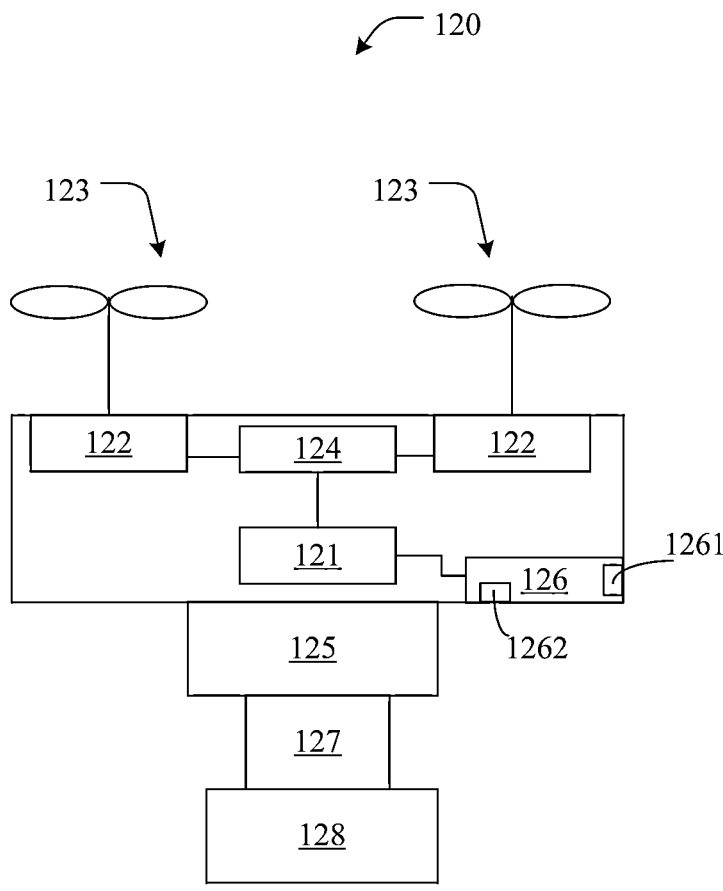
FIG. 12 is a schematic structural diagram of another UAV consistent with embodiments of the disclosure.

The present disclosure further provides a UAV. FIG. 12 is a schematic structural diagram of an example UAV 120 consistent with the disclosure. As shown in FIG. 12, the UAV 120 includes the body, a power system, and a flight controller 121. The power system includes at least one of a motor 122, a propeller 123, or an electronic speed controller 124. The power system can be mounted at the body of the UAV 120 for providing a flight power. The flight controller 121 can be communicatively connected to the power system and configured to control a flight of the UAV 120. As shown in FIG. 12, the UAV 120 further includes an adapter apparatus 125 and a communication system 126. The principles and implementations of the adapter apparatus 125 are similar to those of the adapter apparatus 61 in FIG. 6 and the adapter apparatus 110 in FIG. 11, and detailed description thereof is omitted here. The communication system 126 can be connected to the flight controller 121. The communication system 126 includes a first communication interface 1261 and a second communication interface 1262. The first communication interface 1261 can be configured to receive the control command sent by the control terminal for controlling the load device. The second communication interface 1262 can be configured to send the control command to the adapter apparatus 125, such that the adapter apparatus 125 can send the control command to the load device. The load device includes a gimbal 127 and a third-party device 128.

In some embodiments, the second communication interface 1262 can be further configured to receive the data sent by the adapter apparatus 125. The data can be generated by the load device. The first communication interface 1261 can be further configured to send the data to the control terminal. In some embodiments, the data can include the encrypted data.

Consistent with the disclosure, the load device can be connected to the adapter apparatus, and the adapter apparatus can be connected to the body of the UAV, such that the load device can be carried on the UAV through the adapter apparatus. In response to receiving the control command sent by the UAV for controlling the load device, the adapter apparatus can convert the internal protocol between the UAV and the adapter apparatus to the external protocol between the adapter apparatus and the load device, and use the external protocol to send the control command to the load device. The third-party device produced by the third-party manufacturer can communicate with the UAV through the external protocol, such that the UAV can support the third-party device, thereby increasing the application range of the UAV.

Figure 13:
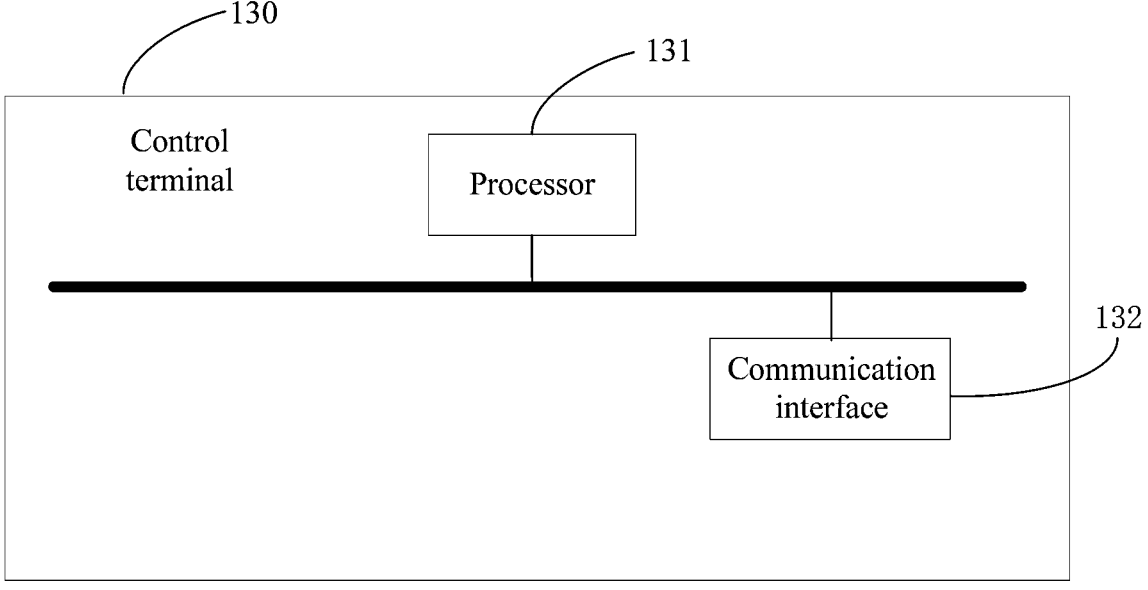
FIG. 13 is a schematic structural diagram of a control terminal consistent with embodiments of the disclosure.

The present disclosure further provides a control terminal. FIG. 13 is a schematic structural diagram of an example control terminal 130 consistent with the disclosure. As shown in FIG. 13, the control terminal 130 includes a processor 131 and a communication interface 132. The processor 131 can be configured to detect the user control operation on the load device, and in response to detecting the operation, send the control command for controlling the load device to the UAV via the communication interface 132.

In some embodiments, the processor 131 can be further configured to receive the data sent by the UAV via the communication interface 132. The data can be generated by the load device and sent to the UAV by the load device through the adapter apparatus.

In some embodiments, before detecting the user control operation on the load device, the processor 131 can be further configured to obtain the control for controlling the load device, and load the control into the APP for controlling the UAV. In some embodiments, detecting, by the processor 131, the user control operation on the load device can include detecting, by the processor 131, the operation on the control by the user.

In some embodiments, obtaining, by the processor 131, the control for controlling the load device can include downloading, by the processor 131, the control for controlling the load device from the server. In some other embodiments, obtaining, by the processor 131, the control for controlling the load device can include receiving, by the processor 131, the control sent by the UAV for controlling the load device via the communication interface 132.

Consistent with the disclosure, the load device can be connected to the adapter apparatus, and the adapter apparatus can be connected to the body of the UAV, such that the load device can be carried on the UAV through the adapter apparatus. In response to receiving the control command sent by the UAV for controlling the load device, the adapter apparatus can convert the internal protocol between UAV and the adapter apparatus to the external protocol between the adapter apparatus and the load device, and use the external protocol to send the control command to the load device. The third-party device produced by the third-party manufacturer can communicate with the UAV through the external protocol, such that the UAV can support the third-party device, thereby increasing the application range of the UAV.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit. The integrated units described above can be implemented in electronic hardware, or in a combination of computer software and electronic hardware.

The integrated units can be stored in a computer readable storage medium when implemented in form of software functional units. The computer program can include instructions that enable a computer device, such as a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

It will be apparent to those skilled in the art that the division of the above functional modules are considered as example only for the convenience and conciseness of the description. In practical applications, the above functions can be allocated to different functional modules according to the requirements. That is, the internal structure of the device can be divided into different functional modules to complete some or all of the functions described above. Detailed descriptions of the operations of example devices may be omitted and references can be made to the descriptions of the example methods.

It is intended that the disclosed embodiments be considered as exemplary only and not to limit the scope of the disclosure. Changes, modifications, alterations, and variations of the above-described embodiments may be made by those skilled in the art within the scope of the disclosure.

What is claimed is:

1. An aerial vehicle comprising:
a body;
a flight controller; and
an adapter apparatus including:
    a first communication interface through which the adapter apparatus is communicatively connected to the flight controller;
    a second communication interface through which the adapter apparatus is communicatively connected to a load device, the load device including a gimbal and a third-party device;
    at least one processor; and
    at least one memory including computer program code, wherein the at least one memory and the computer program code are configured, with the at least one processor, to cause the adapter apparatus to at least:
        receive a control command sent by the flight controller for controlling the load device via the first communication interface;
        convert a first communication protocol between the flight controller and the adapter apparatus into a second communication protocol between the adapter apparatus and the load device; and
        send the control command to the load device using the second communication protocol via the second communication interface.

2. The aerial vehicle of claim 1, wherein the at least one memory and the computer program code are further configured, with the at least one processor, to cause the adapter apparatus to:
send a handshake command to the load device via the second communication interface, the handshake command detecting whether the adapter apparatus and the load device are in a normal communication connection.

3. The aerial vehicle of claim 1, wherein the at least one memory and the computer program code are further configured, with the at least one processor, to cause the adapter apparatus to:
receive data sent by the load device via the second communication interface;
convert the second communication protocol into the first communication protocol; and
send the data to the flight controller using the first communication protocol via the first communication interface.

4. The aerial vehicle of claim 3, wherein:
the adapter apparatus further includes an encryption chip communicatively connected to the at least one processor; and
the at least one memory and the computer program code are further configured, with the at least one processor, to cause the adapter apparatus to:
    encrypt, before sending the data to the flight controller, the data through the encryption chip to obtain encrypted data; and
    send the encrypted data to the flight controller using the first communication protocol via the first communication interface.

5. The aerial vehicle of claim 1, wherein the adapter apparatus further includes:
a power interface configured to supply power to the load device.

6. The aerial vehicle of claim 1, wherein:
the first communication interface includes a universal serial bus (USB) interface;
the second communication interface includes a network port; and
the adapter apparatus further includes:
    a USB to network card chip configured to convert the USB interface to the network port.

7. The aerial vehicle of claim 6, wherein the third-party device is communicatively connected to the adapter apparatus through the network port.

8. The aerial vehicle of claim 1, wherein the at least one memory and the computer program code are further configured, with the at least one processor, to cause the adapter apparatus to:
receive an applet sent by the load device; and
send the applet to the flight controller, such that the flight controller sends the applet to a control terminal.

9. The aerial vehicle of claim 1, wherein the flight controller is configured to:
receive a control command sent by a control terminal for controlling the load device connected to the flight controller via the adapter apparatus; and
send the control command to the load device via the adapter apparatus.

10. The aerial vehicle of claim 1, wherein the flight controller is configured to:
receive data sent by the adapter apparatus, the data being generated by the load device; and
send the data to a control terminal.

11. A control terminal comprising:
a communication interface;
at least one processor; and
at least one memory including computer program code, wherein the at least one memory and the computer program code are configured, with the at least one processor, to cause the control terminal to at least:
    receive an applet sent by an aerial vehicle, the applet being received by the aerial vehicle from an adapter apparatus, the applet being received by the adapter apparatus from a load device connected to the aerial vehicle via the adapter apparatus, the applet being configured to control the load device, and the load device including a third-party device;
    generate and send a control command to the aerial vehicle for controlling the load device based on the applet; and
    load the applet into an application configured to control the aerial vehicle in the control terminal, to cause the application with the loaded applet to control the aerial vehicle and the third-party device simultaneously.

12. The control terminal of claim 11, wherein the at least one memory and the computer program code are further configured, with the at least one processor, to cause the control terminal to:

receive data sent by the aerial vehicle, the data being generated by the load device, and the data being received by the aerial vehicle from the adapter apparatus.

13. The control terminal of claim 12, wherein the data includes encrypted data.

14. The control terminal of claim 11, wherein the at least one memory and the computer program code are further configured, with the at least one processor, to cause the control terminal to:

detect a user control operation on the load device;

in response to detecting the user control operation, generate and send the control command for controlling the load device to the aerial vehicle.

15. A method for controlling a control terminal, comprising:

receiving an applet configured to control a load device, the load device being connected to an aerial vehicle through an adapter apparatus, the aerial vehicle being communication connected with the control terminal;

in response to detecting a user control operation at the applet, generating a control command for controlling the load device; and downloading the applet from a server, and loading the applet into an application configured to control the aerial vehicle in the control terminal; or in response to the load device being in a working state, receiving the applet sent by the aerial vehicle, the applet being received by the aerial vehicle from the load device through the adapter apparatus.

16. The method of claim 15, further comprising:

loading the applet into an application configured to control the aerial vehicle in the control terminal.

\* \* \* \* \*